United States Patent [19]

Kampf

[11] Patent Number: 4,771,872

[45] Date of Patent: Sep. 20, 1988

[54] CLUTCH MECHANISM WITH FREEWHEELING UNIT DISENGAGEABLE IN THE DRIVING DIRECTION INCLUDING RELEASABLE LOCKING MEANS

[75] Inventor: Klaus Kampf, Lohmar, Fed. Rep. of Germany

[73] Assignee: Jean Walterscheid GmbH, Lohmar, Fed. Rep. of Germany

[21] Appl. No.: 913,487

[22] Filed: Sep. 30, 1986

[30] Foreign Application Priority Data

Oct. 3, 1985 [DE] Fed. Rep. of Germany ....... 3535264

[51] Int. Cl.$^4$ .............................................. F16D 41/02
[52] U.S. Cl. ...................................... 192/28; 192/46; 192/47; 192/114 R
[58] Field of Search ................. 192/28, 25, 114 R, 71, 192/101, 89 A, 46, 47

[56] References Cited

U.S. PATENT DOCUMENTS

| 4,261,453 | 4/1981 | Kunze | 192/71 X |
| 4,306,642 | 12/1981 | Alder | 192/114 R |
| 4,466,520 | 8/1984 | Herman | 192/28 |
| 4,629,044 | 12/1986 | Post et al. | 192/28 |

FOREIGN PATENT DOCUMENTS 3332829  4/1984  Fed. Rep. of Germany .

Primary Examiner—Leslie A. Braun
Assistant Examiner—Richard M. Lorence
Attorney, Agent, or Firm—Toren, McGeady & Associates

[57] ABSTRACT

A clutch mechanism having radially moving control pins which may be actuated to effect switching of the clutch into a freewheeling condition is formed to include catching members which engage the pins to lock them in position when the clutch mechanism switches to freewheeling operation. The catching members are formed with control cams which engage retaining pins to maintain the locked position of the control pins with rotation of a driving clutch member operating to allow the retaining pins to drop out of engagement with the control cam to enable release of the control pins when the clutch is switched back into the torque transmitting position.

3 Claims, 3 Drawing Sheets

CLUTCH MECHANISM WITH FREEWHEELING UNIT DISENGAGEABLE IN THE DRIVING DIRECTION INCLUDING RELEASABLE LOCKING MEANS

This invention relates to a freewheeling clutch coupling comprising a clutch hub and a clutch sleeve drivably connected to one another by a plurality of radially outwardly biased catches on the clutch hub engageable with the clutch sleeve, said hub and sleeve being disengageable from one another in the driving direction. In such a construction of clutch coupling either the clutch hub or the clutch sleeve may be the driving member of the coupling.

One type of such a clutch coupling is known from German Patent Publication No. 33 32 829 wherein driving members in the form of rollers are transferred into a torque transmitting condition via a cage cooperating with an operating ring. To engage such a coupling, the operating ring is arrested by a tappet and, via frictional locking, it acts on a friction ring connected to the cage. During this action the rollers are lifted radially upwardly from pockets in which they are received in the freewheeling condition of the coupling and for operating purposes engaged into the other freewheeling part.

Such a coupling can properly only be referred to as a switching clutch as it cannot carry out all of the necessary functions associated with a freewheeling clutch coupling. Additionally, the unit described in this German Patent Publication is of a complicated design and has the disadvantage that the rollers comprising the driving members can only contact specific profiles of the clutch part which is to be engaged during transition to the torque transmitting condition thereby causing a high area of pressure loading leading to rapid wear.

In U.S. Pat. No. 4,466,520 there is taught a single revolution clutch consisting essentially of two clutch parts supported concentrically relative to one another. The outer clutch part provides radial guidance for a driving pin which, via actuating means, is moved into uniformly circumferentially distributed recesses of the inner clutch part. The outer clutch part is surrounded by a guide ring which ensures that the driving pin maintains the connection between the two clutch parts during one revolution thereof.

Although the clutch described in U.S. Pat. No. 4,466,520 cannot carry out a freewheeling function, it does suffer from problems similar to those of an automatically re-engaging freewheeling unit in that there is the risk that the driving pin cannot fully engage, at the time of re-engagement, thereby causing high area pressures leading to damage of the relevant parts.

In U.S. Pat. No. 4,629,044 there is disclosed a clutch mechanism having a freewheeling unit capable of disengagement in a driving direction thereof for freewheeling operation comprising a clutch hub having recesses formed therein; a clutch sleeve having radial apertures circumferentially spaced thereabout corresponding to said recesses in said hub; movable control pins received in said radial apertures; locking catches in said recesses resiliently urging said control pins radially outwardly for effecting torque transmitting engagement between said clutch hub and said clutch sleeve; first stop means limiting radially inwardly directed movement of said control pins; a control ring having recesses with inclined faces formed therein and rotatably held on said clutch sleeve, said control pins being resiliently urged by said locking catches radially outwardly to engage in said recesses in said control ring in a torque transmitting position; second stop means interposed between said clutch sleeve and said control ring limiting relative angular movement therebetween; spring means acting in the circumferential direction interposed between said clutch sleeve and said control ring applying a spring force to hold said recesses in said control ring and said control pins in positions corresponding to each other; and a retaining device adapted to hold said control ring against the force of said spring means to move said control pins radially inwardly against said locking catches to effect freewheeling operation.

Such a clutch mechanism having a freewheeling unit as disclosed in U.S. Pat. No. 4,629,044 finds application, for example, in the drive train of agricultural implements wherein it may be necessary to effect a rapid uncoupling between the clutch hub and clutch sleeve to avoid the possibility of damage to the driven implement. A particular example is in harvesting equipment wherein there is always the potential danger of the harvesting blades impinging upon foreign bodies on the ground, especially upon metal objects such as broken tines or blades. In such an example, a metal detector could be mounted upon the harvester to provide a signal to actuate the said retaining device to hold the control ring to disengage the clutch hub from the clutch sleeve to effect freewheeling operations.

It is an object of the present invention to provide a clutch mechanism having a freewheeling unit capable of disengagement in a driving direction thereof for freewheeling operation which operates to ensure that, during re-engagement from the freewheeling position to the torque transmitting position, the driving and driven members always become fully engaged with one another for driving purposes.

SUMMARY OF THE INVENTION

In accordance with the invention there is provided a clutch mechanism having a freewheeling unit capable of disengagement in a driving direction thereof for freewheeling operation comprising a clutch hub having recesses formed therein; a clutch sleeve having radial apertures circumferentially spaced thereabout corresponding to said recesses in said hub; movable control pins received in said radial apertures; first spring means acting to bias said control pins radially outwardly of their respective said radial apertures; locking catches in said recesses resiliently biassed radially outwardly for effecting torque transmitting engagement between said clutch hub and said clutch sleeve; first stop means limiting radially inwardly directed movement of said control pins; a control ring having recesses formed with inclined faces therein and rotatably held on said clutch sleeve, said control pins being resiliently urged by said locking catches radially outwardly to engage in said recesses in said control ring in a torque transmitting position; second stop means interposed between said clutch sleeve and said control ring limiting relative angular movement therebetween; second spring means acting in the circumferential direction interposed between said clutch sleeve and said control ring applying a spring force to hold said recesses in said control ring and said control pins in positions corresponding to each other; a retaining device adapted to hold said control ring against the force of said spring means to move said control pins radially inwardly against said locking catches to effect freewheeling operation; a latch member associated with each control pin and being resiliently biased into latching engagement therewith; a retaining pin movable between latch holding and latch release positions in response to engagement of said retaining pin with a cam formation on said clutch hub whereby, in said latch holding position, said latch is retained in engagement with a said control pin to hold said control pin in a radially inward position and whereby, when said retaining device is moved to release said control ring to disengage the freewheeling condition of the freewheeling unit, said cam formation on the clutch hub delays movement of said retaining pin from its latch holding to it latch release position during a degree of relative angular movement between said clutch hub and said clutch sleeve.

The advantage of the freewheeling unit of the present invention is thus that the locking catches are released to re-engage the clutch sleeve whilst the control pins are retained temporarily in their radially outward positions by the latch members whenever the freewheeling unit is transferred from the freewheeling position into the torque transmitting position; the catches thus always becoming fully engaged with the clutch sleeve.

DESCRIPTION OF THE DRAWINGS

Other features of the invention will become apparent from the following description given herein solely by way of example with reference to the accompanying drawings wherein.

DETAILED DESCRIPTION OF THE PREFERRED EMBODIMENT

Figure 1:
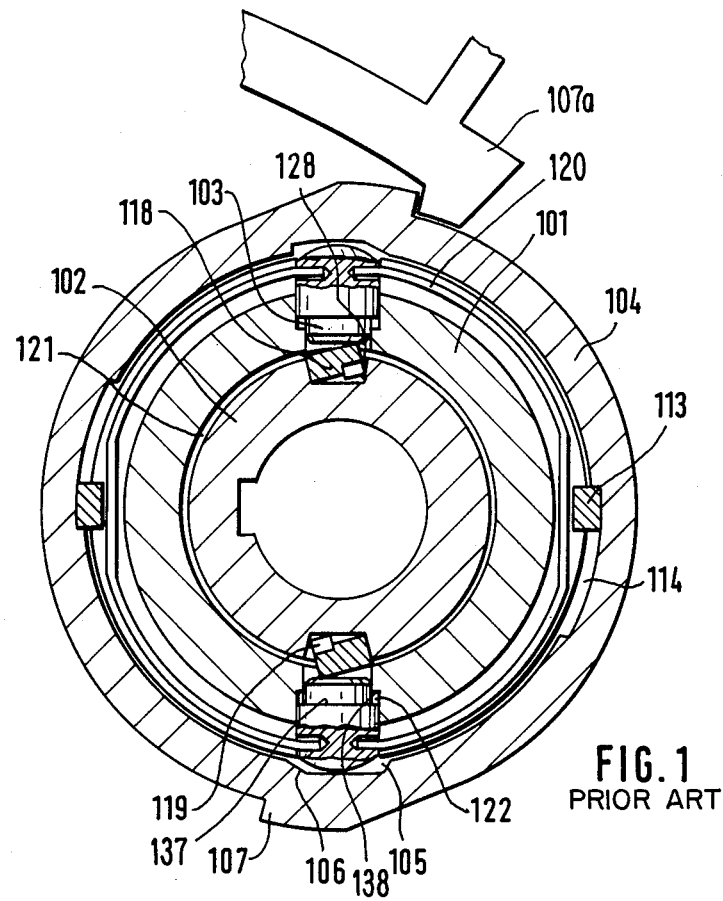
FIG. 1 is a transverse cross-sectional view through a clutch mechanism having a freewheeling unit as disclosed in U.S. Pat. No. 4,629,044.
Figure 2:
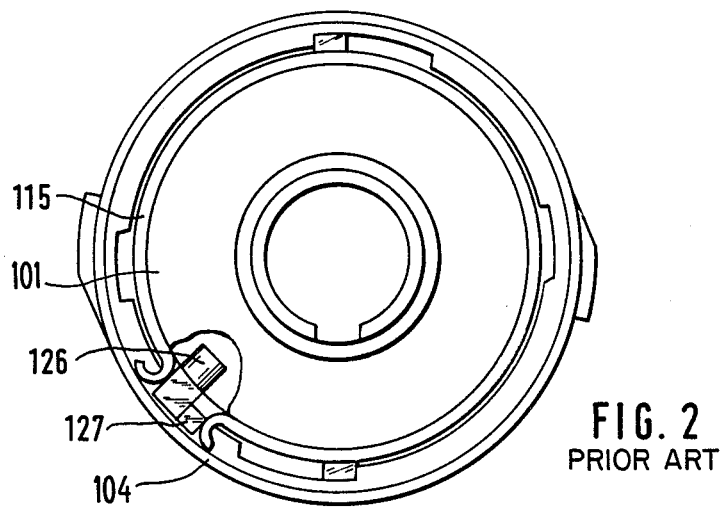
FIG. 2 is a transverse partial cross-sectional view of the clutch mechanism of FIG. 1.

The clutch mechanism illustrated in FIGS. 1 and 2 is of the type disclosed in U.S. Pat. No. 4,629,044 comprising an internally splined clutch hub 102 and an annular clutch sleeve 101 rotatably mounted on the hub. In this embodiment the clutch hub 102 is the driving element and the clutch sleeve 101 is the driven element; driving engagement being effected by means of radially outwardly biased locking catches 118 on the clutch hub engageable with the clutch sleeve. Each said locking catch 118 comprises an axially elongate element seated within a recess 128 in the radially outer surface of the clutch hub 102 and being biased radially outwardly of the recess by means of a leaf spring 119 within the recess 128 underneath one edge of the elongate element. Said one edge is thereby biased into engagement with the radially inner end of a corresponding radial aperture 122 extending through the clutch sleeve.

Thus, referring to FIG. 1, clockwise rotational drive is imparted to the clutch sleeve 101 from the driving clutch hub 102 by means of the radially outwardly projecting axially extending edges of the locking catches 118 engaging within the corresponding radially innermost parts of the apertures 122 in the clutch sleeve.

Within each said radial aperture 122 in the clutch sleeve 101 there is mounted a control pin 103 having a radially directed annular shoulder intermediate its end engageable with stop means 137, 138 comprising a counter-bore in the said aperture 122 in the clutch sleeve 101 for limiting the degree of radially inwardly movement of the pin 103. Each pin 103 is biased radially outwardly of the clutch sleeve by the leaf spring 119 acting on the corresponding catch 118 and thence on the radially inner end of the control pin 103. Each control pin is 103 additionally resiliently biased radially outwardly of the clutch sleeve 101 by means of circumferential spring elements 120 extending around the clutch sleeve and engaging within recesses in each control pin.

A control ring 104 is circumferentially mounted for limited rotation about the radially outer surface of the clutch sleeve 101 and said control ring is provided with a recess 105 to receive the radially outer end of a corresponding control pin 103. Each such recess 105 is provided with an inclined ramp face 106 facing towards the direction of rotation.

Spring biasing means in the form of a circumferential spring 115 is located about the clutch sleeve 101 acting directly between a first stop 126 extending radially outwardly of the clutch sleeve and a second stop 127 on the control ring 104 whereby the control ring 104 is biased to the position shown in FIG. 1 wherein the radially outer end of each control pin 103 is received within its corresponding recess 105 in the control ring 104 i.e. the control ring is biased to the torque transmitting position of the freewheeling unit.

The function of the spring 115 is shown in FIG. 2. The spring 115 is a circumferential spring which is split. The clutch sleeve 101 has a radially extending first stop 126 against which one of the ends of spring 115 abuts. The control ring 104 has a second stop 127 extending radially inwardly. The second end of the spring 115 abuts this second stop 127. By the circumferential force resulting from the circumferential spring 115, the two stops 126 and 127 are biased to abut each other, which means that the control ring 104 is moved in the circumferential direction if no force is applied to its outer circumference to the position as shown in FIG. 2. The spring 115 lies in a different plane as the control pin 103 which is shown in FIG. 1.

The result of the force of the spring 115 acting onto the control ring 104 leads to a position of the control pin or in other words of the control ring 104 in respect to the control pin 103 as shown in FIG. 1.

From the description given thus far it will be appreciated that if the control ring 104 is restrained against rotational movement with the clutch sleeve 101, relative rotation will be effected between the control ring and the clutch sleeve causing the radially outer surfaces of the control pins 103 to ride up the recess ramp faces 106 thereby to displace the control pins radially inwardly and depress the catches 118 on the clutch hub 102 whereby the freewheeling position of the coupling is effected. Recesses 114 in the radially inner surface of the control ring co-operating with associated stops 113 limit the degree of relative rotation between the control ring 104 and the clutch sleeve 101 when the control ring is restrained against rotational movement. In this embodiment said restraint of the control ring 104 against rotational movement with the clutch sleeve is achieved by means of a retaining formation 107 on the radially outer surface of the control ring engageable by a retaining device 107a.

When the restraint on the control ring is removed, the ring is biased by means of the circumferential spring 115 back to the position shown in FIG. 1 whereby transition is effected automatically from the freewheeling position to the torque transmitting position by permitting the radially outer ends of the control pins 103 to re-engage within the corresponding recesses 105 in the control ring and thereby also permitting the locking catches 118 on the clutch hub to re-engage with the clutch sleeve.

However, in the construction hereinbefore described with reference to FIGS. 1 and 2, there is a possibility that the locking catches 118 may not re-engage completely within the radially inner ends of the apertures 122 in the clutch sleeve and, in FIGS. 3 to 6 of the drawings, there is illustrated a clutch mechanism constructed in accordance with the invention which will overcome the problem of incomplete re-engagement of the locking catches with the clutch sleeve.

Thus, referring to FIGS. 3 to 6, the clutch hub 102, the clutch sleeve 101 and each control pin 103 are provided with mutually cooperable latching and retaining means whereby it will be ensured that the locking catches 118 on the clutch hub 102 are able to re-engage fully into the radially inner ends of the apertures 122 in the clutch sleeve 101 during the transition from the freewheeling position back to the torque transmitting position. Each control pin 103 has an axis extending generally radially of the hub 102. In the clutch sleeve 101 there is provided a tangential bore or transverse bore extending transversely of the axial direction of the control pin 103. A latch member 131 is movable in the transverse bore and is biased towards an associated control pin 103 by means of a coil compression spring 132 acting between one end of the latch member 131 and an abutment pin 135 secured within the clutch sleeve and extending into the tangential or transverse bore. That end of the latch member 131 proximate to the control pin has a cam shaped nose for engagement within a corresponding recess 130 in the side wall of the control pin 103 whereby the nose of the latch member 131 is engageable within said recess 130 in the control pin under the influence of the compression spring 132 as will be further explained below.

The clutch sleeve 101 is also provided with a further bore extending perpendicularly from said tangential or transverse bore to the radially inner surface of the clutch sleeve. A retaining pin 134 is movable within this bore, said pin having a radially inner end engageable, as shown in FIG. 3, by the radially outer surface of the clutch hub 101 and having a radially outer end shaped to retain the latch member 131 by means of a projection 133 on the latch member in the retracted position of the latch member shown in FIG. 3.

Figure 3:
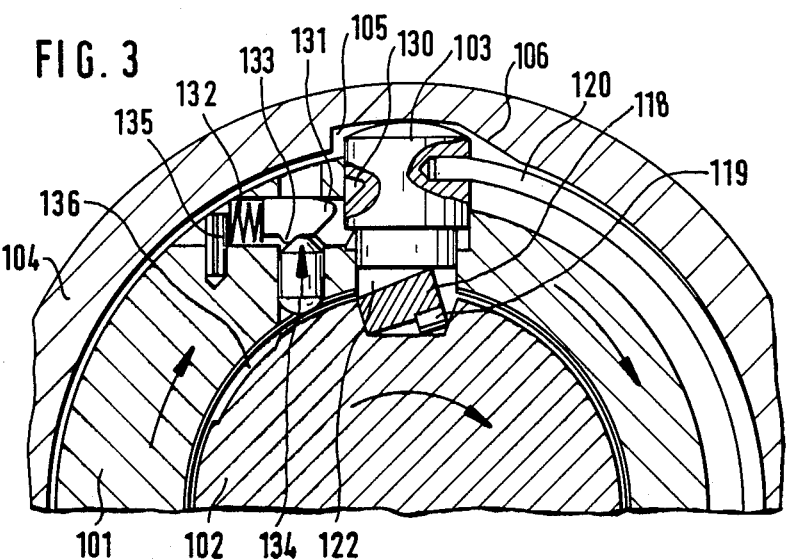
FIG. 3 is a partial transverse cross-sectional view through a clutch mechanism constructed in accordance with the present invention showing the freewheeling unit in a torque transmitting position.

Thus in the normal torque transmitting position of the freewheeling unit shown in FIG. 3, the latch member 131 is retained in its retracted position by means of the retaining pin 134 which itself is held in position by virtue of the engagement of the radially inner end of the retaining pin on the radially outer surface of the clutch hub 101.

Figure 4:
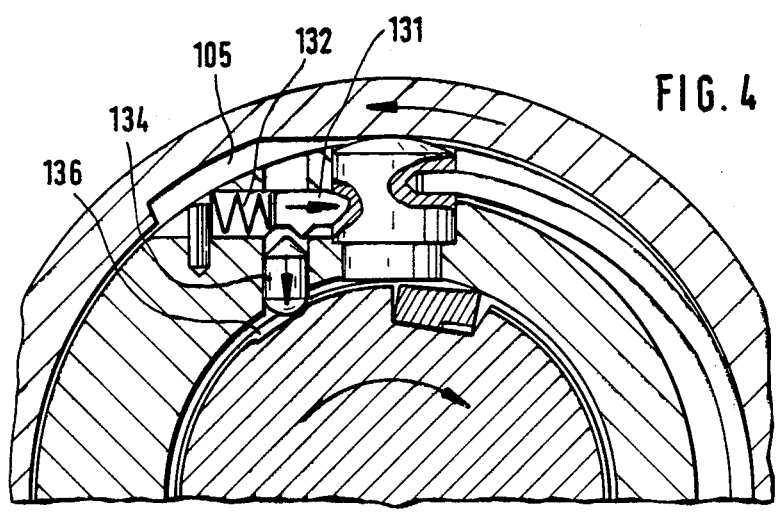
FIG. 4 is a similar view to that of FIG. 3 showing the freewheeling unit in a freewheeling position.

When the control ring is restrained against movement with the clutch sleeve to enable the transition from the torque transmitting position to the freewheeling position to occur, the control pin 103 is moved radially inwardly as it rides off the inclined ramp face 106 of the recess 105 in the control ring 104 thus depressing the locking catch 118 and enabling the freewheeling position to be attained. Immediately upon transition to the freewheeling position as shown in FIG. 4, the radially inner end of the retaining pin 134 is permitted to enter a cam formation depression 136 in the radially outer surface of the clutch hub 101 thereby releasing the latch member 131 to enable the latch member to engage within the recess 130 in the control pin under the influence of the compression spring 132. Thereafter, during freewheeling operation of the clutch mechanism the latch member remains in engagement with the recess in the control pin.

Figure 5:
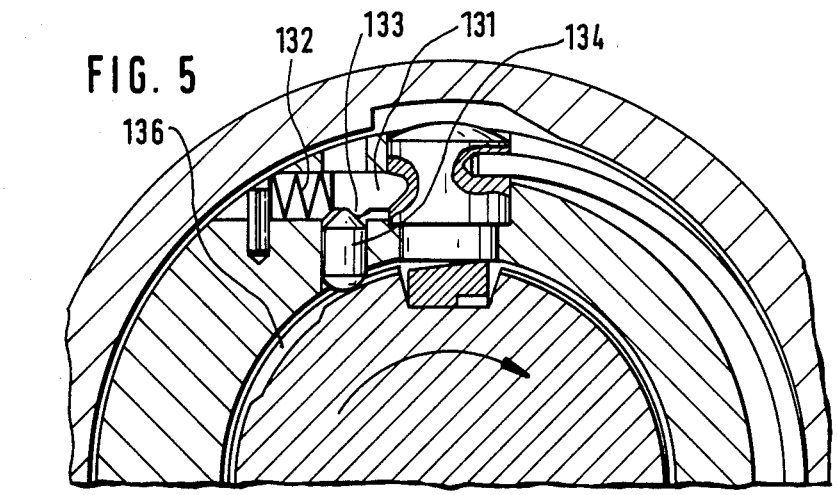
FIG. 5 is a similar cross-sectional view to that of FIG. 3 showing a transitional position between a freewheeling and re-engaged torque transmitting position wherein re-engagement into the torque transmitting position is prevented by a latch member associated with the control pin.

Upon removal of the restraint on the control ring to permit return to the torque transmitting position, the control ring 104 will return to the position shown in FIG. 5 with the recess 105 in the control ring ready to receive the radially outer end of the control pin 103. However, the control pin 103 is not permitted immediately to return to its radially outer position and thereby also release the locking catch 118 because the latch member 131 continues to be retained by the retaining pin 134 in its engaged position with the control pin until such time as the clutch hub 102 has rotated further relative to the clutch sleeve to permit the radially inner end of the retaining pin 134 to enter the cam formation recess 136 in the clutch hub.

Figure 6:
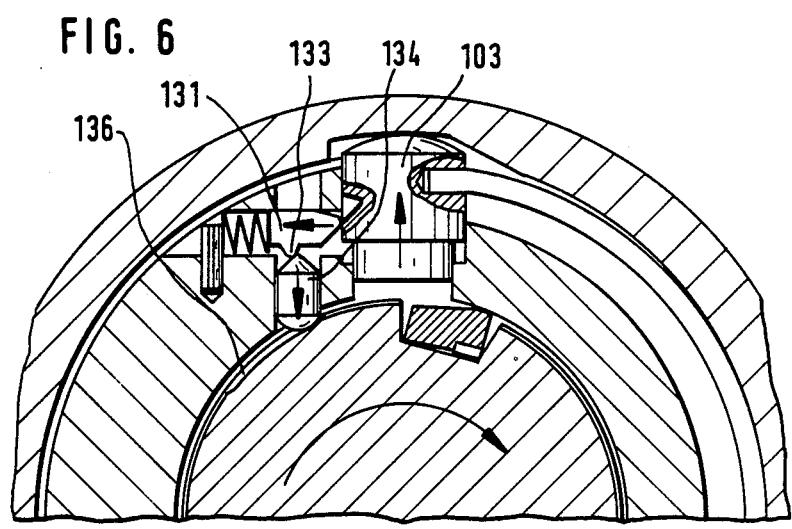
FIG. 6 is a similar cross-sectional view to that of FIG. 3 showing the freewheeling unit after the latch member has released the control pin but before the locking catch has re-engaged the clutch sleeve for full transition to a torque transmitting position.

In FIG. 6, the retaining pin 134 is shown at the commencement of its entry into the cam formation recess 136 in the clutch hub at which time the locking catch 118 has already passed the radially inner end of the aperture 122 in the clutch sleeve housing the control pin 103. When the retaining pin 134 enters the cam formation recess 136 in the clutch hub as shown in FIG. 6, the radially outer end of the retaining pin 134 clears the projection 133 on the latch member 131 thereby enabling the latch member to be retracted as the force of the circumferential spring 120 causes the nose of the latch member 131 to ride out of the recess 130 in the control pin and move the latch member 131 to the position shown in FIG. 6 at which time the latch member is then held in its retracted position as soon as the retaining pin 134 is forced radially outwardly behind the projection 133 on the latch member 131 as the inner end of the retaining pin 134 rides out of the cam formation recess 136 on the clutch hub and into engagement with the outer surface of the clutch hub. During this time momentary continuance of the freewheeling operation is maintained until the locking catch 118 reaches the next aperture 122 in the clutch sleeve at which time it can freely enter such aperture to effect driving connection with the clutch sleeve and thus effect the torque transmitting position of the clutch mechanism.

It will thus be appreciated that such an arrangement ensures that the control pins 103 are moved to their radially outermost positions with their radially outer ends engaged within the corresponding recesses 105 in the control ring before the corresponding locking catches 118 are required to enter the radially inner ends of the apertures 122. Thus, referring to FIG. 6, when the locking catch 118 reaches the next aperture 122 in the clutch sleeve 101 it can enter said aperture freely under the influence of its leaf spring 119 without any possible impediment by the control pin. This arrangement thus provides an advantage over the construction described with reference to FIGS. 1 and 2 wherein, at the moment of transition from the freewheeling to the torque transmitting positions, the locking catch is attempting to enter the radially inner end of the aperture in the clutch sleeve at the same time as the control pin is being moved radially outwardly therefrom.

What is claimed is:

1. A clutch mechanism having a freewheeling unit capable of disengagement in a driving direction thereof for freewheeling operation comprising:
   a clutch hub having recesses formed therein;
   a clutch sleeve having radial apertures circumferentially spaced thereabout corresponding to said recesses in said hub;
   movable control pins received in said radial apertures and each said control pin having an axis extending generally radially relative to said clutch hub;
   first spring means acting to bias said control pins radially outwardly of their respective said radial apertures;
   locking catches in said recesses resiliently biased radially outwardly for effecting torque transmitting engagement between said clutch hub and said clutch sleeve;
   first stop means limiting radially inwardly directed movement of said control pins;
   a control ring having recesses with inclined faces formed therein and rotatably held on said clutch sleeve, said control pins being resiliently urged by said locking catches radially outwardly to engage in said recesses in said control ring in a torque transmitting position;
   second stop means interposed between said clutch sleeve and said control ring limiting relative angular movement therebetween;
   second spring means acting in the circumferential direction interposed between said clutch sleeve and said control ring applying a spring force to hold said recesses in said control ring and said control pins in positions corresponding to each other;
   a retaining device adapted to hold said control ring against the force of said second spring means to move said control pins radially inwardly against said locking catches to effect freewheeling operation;
   a latch member associated with each control pin and being resiliently biased into latching engagement therewith;
   a retaining pin movable between latch holding and latch release positions in response to engagement of said retaining pin with a cam formation on said clutch hub whereby, in said latch holding position, said latch is retained in engagement with a said control pin to hold said control pin in a radially inward position and whereby, when said retaining device is moved to release said control ring to disengage the freewheeling condition of the freewheeling unit, said cam formation on the clutch hub delays movement of said retaining pin from its latch holding to its latch release position during a degree of relative angular movement between said clutch hub and said clutch sleeve.

2. A clutch mechanism as claimed in claim 1, wherein
   a locking recess is formed in each said control pin having a wedge-shaped outwardly expanding configuration;
   each said latch member is mounted in said clutch sleeve and has a head corresponding to the wedge-shaped configuration of said locking recesses and is aligned therewith; and
   said head of each said latch member has a radially inner wedge face extending at an angle such that in cooperation with said first spring means there is provided a force component which acts against and is greater than a spring force loaded each said latch member in the direction transverse to the axial direction of the corresponding control pin.

3. A clutch mechanism as claimed in claim 2, wherein
   control cam means are formed on each said latch member pointing generally radially inwardly;
   said retaining pin is guided for movement perpendicularly to the direction of movement of said latch member transverse to the axial direction of said control pin and is arranged in the range of movement of said control cam means transverse to the axial direction of said control pin; and
   circumferentially extending track means are provided at said clutch hub including a first track part and a second track part, said second track part being provided with a cam formation;
   said retaining pin being arranged to rest against said first track part to be held within the range of movement of said control cam means to hold said latch members out of engagement with said locking recesses and to engage within said cam formation of said second track part as a result of rotation of said clutch hub relative thereto to move said retaining pins outwardly from the range of movement of said control cam means to effect release of said latch members.

* * * * *